(12) United States Patent
Andersen et al.

(10) Patent No.: US 6,745,101 B2
(45) Date of Patent: Jun. 1, 2004

(54) DEFLECTION COMPENSATION FOR NUMERICAL CONTROLLED MANUFACTURING

(75) Inventors: J. Blades Andersen, Eatonville, WA (US); Robert A. Kisch, Auburn, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/166,855

(22) Filed: Jun. 11, 2002

(65) Prior Publication Data
US 2003/0229415 A1 Dec. 11, 2003

(51) Int. Cl.$^7$ ............................................... G06F 19/00
(52) U.S. Cl. ...................................... 700/193; 700/186
(58) Field of Search .................... 700/54, 71, 173–176, 700/192, 193, 189, 186

(56) References Cited

U.S. PATENT DOCUMENTS

| | | | | |
|---|---|---|---|---|
| 4,370,721 A | * | 1/1983 | Berenberg et al. | .......... 700/195 |
| 4,796,195 A | * | 1/1989 | Haggerty | .................... 700/193 |
| 5,387,061 A | * | 2/1995 | Barkman et al. | .............. 409/80 |
| 5,735,028 A | * | 4/1998 | Furusawa et al. | ........... 29/27 R |
| 6,256,546 B1 | | 7/2001 | Graham et al. | |

* cited by examiner

Primary Examiner—Leo Picard
Assistant Examiner—Ryan A Jarrett
(74) Attorney, Agent, or Firm—Harness Dickey & Pierce P.L.C.

(57) ABSTRACT

A method and system compensates for vertical deflection for parts manufactured by a numerically controlled (NC) machine. The (NC) machine has an application head position programmed to a plurality of nominal tool coordinates. Each nominal tool coordinate has a horizontal coordinate, a rotational coordinate, and a vertical coordinate. A tool used to manufacture the part is placed on the NC machine. The tool has a plurality of actual tool coordinates, each actual tool coordinate has a horizontal component, a rotational component, and a vertical sag component. A difference between each vertical sag component and a corresponding one of the nominal tool coordinates is calculated. Each difference is multiplied by a multiplier value providing an adjusted sag value. Each adjusted sag value is subtracted from the application head position for each actual tool horizontal or rotational coordinate to compensate the part for the vertical sag of the tool during manufacture.

36 Claims, 5 Drawing Sheets

DATA LOOK-UP TABLE

| | Z1 = 35 | Z2 = 65 | Z3 = 95 | Z4 = 125 | Z5 = 155 | Z6 = 185 | Z7 = 215 | Z8 = 245 |
|---|---|---|---|---|---|---|---|---|
| C1=0 | .001 | .038 | .119 | .248 | .126 | .113 | .097 | .001 |
| C2=45 | .005 | .060 | .235 | .424 | .251 | .226 | .176 | .009 |
| C3=90 | .009 | .088 | .317 | .565 | .342 | .295 | .245 | .012 |
| C4=135 | .006 | .088 | .298 | .502 | .323 | .279 | .257 | .011 |
| C5=180 | .004 | .085 | .264 | .439 | .292 | .245 | .216 | .008 |
| C6=225 | .002 | .056 | .173 | .345 | .195 | .157 | .138 | .006 |
| C7=270 | .001 | .052 | .132 | .307 | .154 | .126 | .116 | .003 |
| C8=315 | .001 | .038 | .116 | .267 | .141 | .119 | .107 | .002 |
| C9=360 | .001 | .038 | .119 | .248 | .126 | .113 | .097 | .001 |

Fig. 5

DEFLECTION COMPENSATION FOR NUMERICAL CONTROLLED MANUFACTURING

FIELD OF THE INVENTION

The present invention relates in general to numerical control manufacture and more specifically to a system and method to compensate for vertical deflection during manufacture.

BACKGROUND OF THE INVENTION

Some manufacturing processes, for example fiber placement, require exact definition of part location to be successful. The placement and orientation of individual fibers of a fiber part must be consistent and within the allowable limits of spacing between fibers or courses of fibers. Hand-lay up of fiber parts is typically performed for large or unusually shaped objects. When larger parts are required, and the number of individual fibers or fiber sheets increases because of the size of the part, the amount of time required to lay-up the fiber parts becomes prohibitive.

Manufacturing processes using numerically controlled (NC) machines have been used to manufacture fiber components. With the NC machines commonly used, improvements in speed and quality are achieved in smaller parts. When an NC machine is used, a mold or tool is placed on the machine about which the fibers are laid, before the fibers are heat treated to harden the part. The tool can be supported from one end (i.e., cantilevered) or supported from both ends. The tool will normally deflect both due to gravity along its unsupported length and based on its cross sectional shape. NC machines normally provide one or more supports to minimize sag from gravity deflection. It is undesirable, however, to support a fiber laminating tool at any location where the laminate is applied because the support must contact the tool, interfering with the laying of individual fibers on the part. Tool deflection during the lamination process therefore results in laminate being incorrectly applied.

Methods to identify and compensate for the amount of gravity induced deflection of the tool are known. In one method, a maximum deflection of the tool is calculated and the average deflection is used as an incremental change for the NC tool applying the individual laminate fibers. The use of an average deflection can over-compensate some areas of the component and under-compensate other areas of the component. By not properly compensating the amount of sag for the position the laminate application head of the NC machine is at, the fibers can be misplaced or spaced inappropriately causing part defects. In highly stressed components such as used in the commercial aircraft industry, fiber laminated components are used. Defective parts having fibers laminated with improper spacing or at an improper angle do not produce acceptable parts for high stress applications.

It is therefore desirable to provide a method and a system to compensate for the gravity-induced deflection of the tools used for laminate construction of laminated parts.

SUMMARY OF THE INVENTION

According to a preferred embodiment of the present invention, a method and system are provided to compensate for vertical deflection of the tools used for laminate manufacture. A numerical manufacturing model to manufacture a part is developed based on its nominal (i.e., non-deflected) dimensions and is loaded in a computer database as a plurality of motion statements. A set of material properties for the part including the number of laminate layers and laminate layer directions are also programmed into the computer. The part is typically laminated over a tool (acting as a mold) that is supported on at least one end, and a vertical deflection of the tool due to gravity results. The vertical deflection of the tool, hereinafter referred to as sag, is calculated or measured. A dimensional difference between the calculated or measured tool sag and the numerical manufacturing model is calculated. The calculated dimensional difference is applied as a compensation value during part manufacture to ensure the part dimensionally matches the numerical manufacturing model.

Because a variety of part shapes are manufactured using an NC machine, a variety of individual tools to support those shapes are also used. Each individual tool can sag differently over an unsupported length of the tool. The amount of sag is determined by calculation, or by measuring the actual tool, and a set of actual sag values is produced. A representative quantity of the actual sag values are input into a computer database in a lookup table. For each given motion statement, (i.e., for each nominal position along the part being manufactured) the computer interpolates between the representative values in the lookup table to produce a sag value for that nominal location. The sag value is applied to the given motion statement to direct the vertical position of a laminate application head of the NC machine. The laminate application head is thereby positioned to a tool actual location, allowing for tool sag, for each part nominal coordinate.

The lookup table provides the representative sag values based on C-axis rotation position and Z-axis position (i.e., horizontal position) on the tool. The number of representative sag values in the lookup table is controlled at the user's discretion based on the geometry and length of the part being manufactured. A macro interrogates each motion statement for part coordinate values. The lookup table is entered using the part coordinate values and a sag value is calculated by interpolating between the Z-axis positions and the C-axis rotation positions closest to the part coordinate values. A Z-Index value is input by the user. The Z-Index value can be applied to each calculated sag value to index the lookup table values to a global tool horizontal position on the NC machine. A multiplier is also input by the user. The multiplier can be used to adjust up or down the calculated sag value generated by data derived from the lookup table. The above process is repeated for each subsequent motion statement until the end of the file is reached.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is an exemplary table of data points which are loaded into the computer database of a computer to identify the amount of deflection for individual points along an exemplary tool at a given tool rotation using the deflection compensation system of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
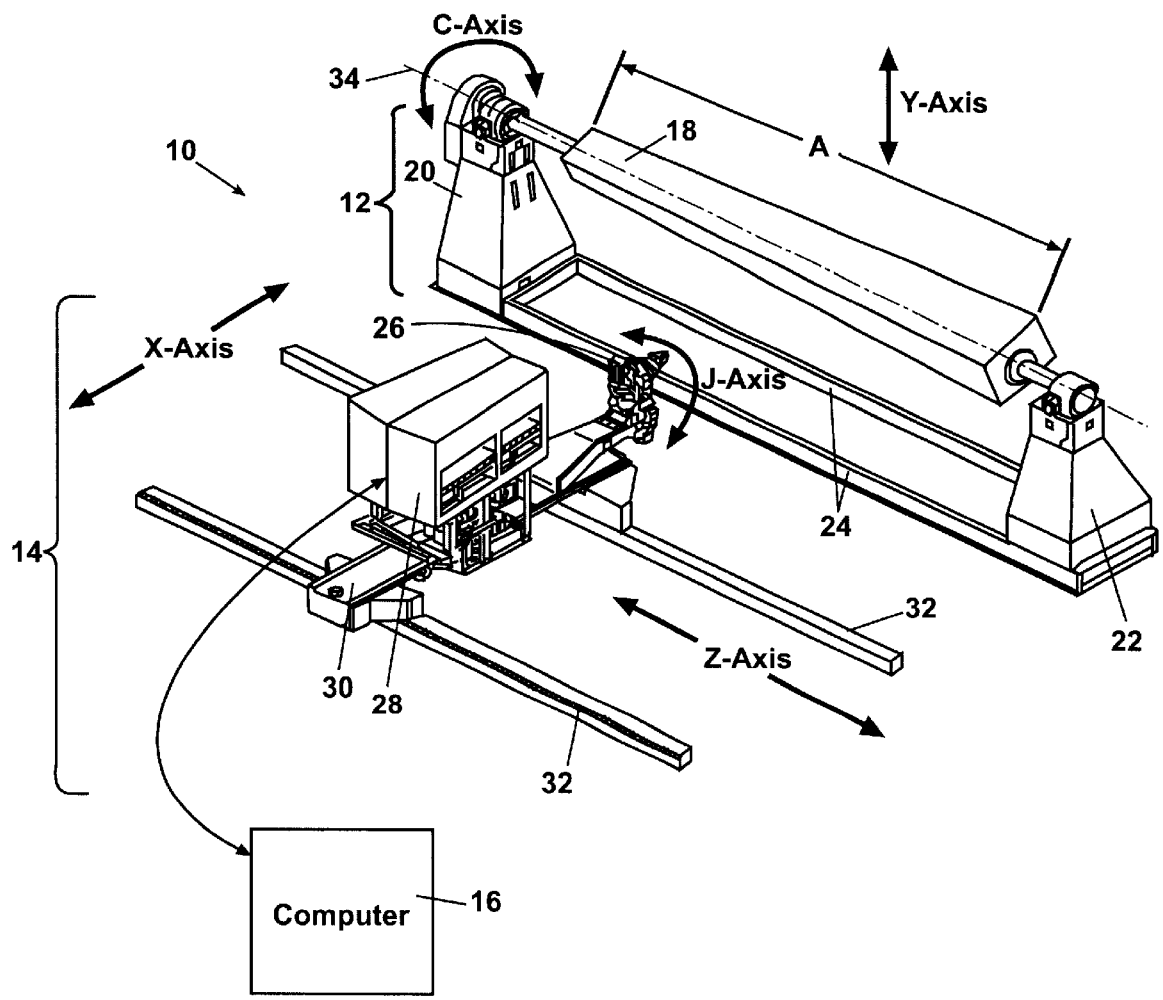
FIG. 1 is a perspective view of a deflection compensation system using an NC machine to laminate component parts.

Referring to FIG. 1, a deflection compensation system 10 according to a preferred embodiment of the present invention is shown. The deflection compensation system 10 comprises a tool support 12, an application tool 14 and a computer 16. The tool support 12 further comprises a tool 18 supported between a head stock 20 and a tail stock 22. The head stock 20 and the tail stock 22 are joined by a pair of tool support legs 24.

The application tool 14 further comprises an application head 26. The application head 26 is rotatable up and down about a machine J-axis and translatable both vertically about a machine Y-axis and toward or away from the tool 18 about a machine X-axis. The application head is supported by a head driver 28. The head driver 28 is supported by a driver support frame 30. The driver support frame 30 translates about a machine Z-axis and is supported by a pair of driver support legs 32.

In use, the tool 18 is supported along a tool centerline 34 and acts as a mold about which a plurality of layers of laminate material (shown in FIG. 3) is applied. The tool 18 is rotatable about a machine C-axis to permit application of laminate material about the perimeter of the tool 18. As the tool 18 rotates, the application head 26 translates horizontally along the machine Z-axis at a predetermined distance from the tool centerline 34, to apply material to an outer surface of the tool 18. To follow the perimeter geometry of the tool 18, the application head 26 can also rotate up and down about the machine J-axis and translate toward or away from the tool 18 along the machine X-axis. The application head 26 is programmed to follow a nominal path (by a plurality of motion statements) matching a nominal geometry of the tool 18. According to a preferred embodiment of the present invention, vertical deflection (i.e., deflection in the machine Y-axis direction) of the tool 18 along its unsupported length is calculated and the application head 26 machine Y-axis position is adjusted to correct the motion statement position of the application head 26.

As the application head 26 translates relative to the tool 18, a laminate material (shown in FIG. 3) is applied to the tool 18. By varying the axis of motion of the application head 26 as well as the amount of rotation of the tool 18, a variety of patterns of laminate can be applied to the tool 18. The motions for the application tool 14 as well as the tool support 12 supporting the tool 18 are controlled by the computer 16. Data is input into the computer 16 to identify the geometry of the tool 18 and the quantity and depth of individual laminate layers required by the part to be produced. The application head 26 applies laminate material along the entire tool length A as required.

Figure 2:
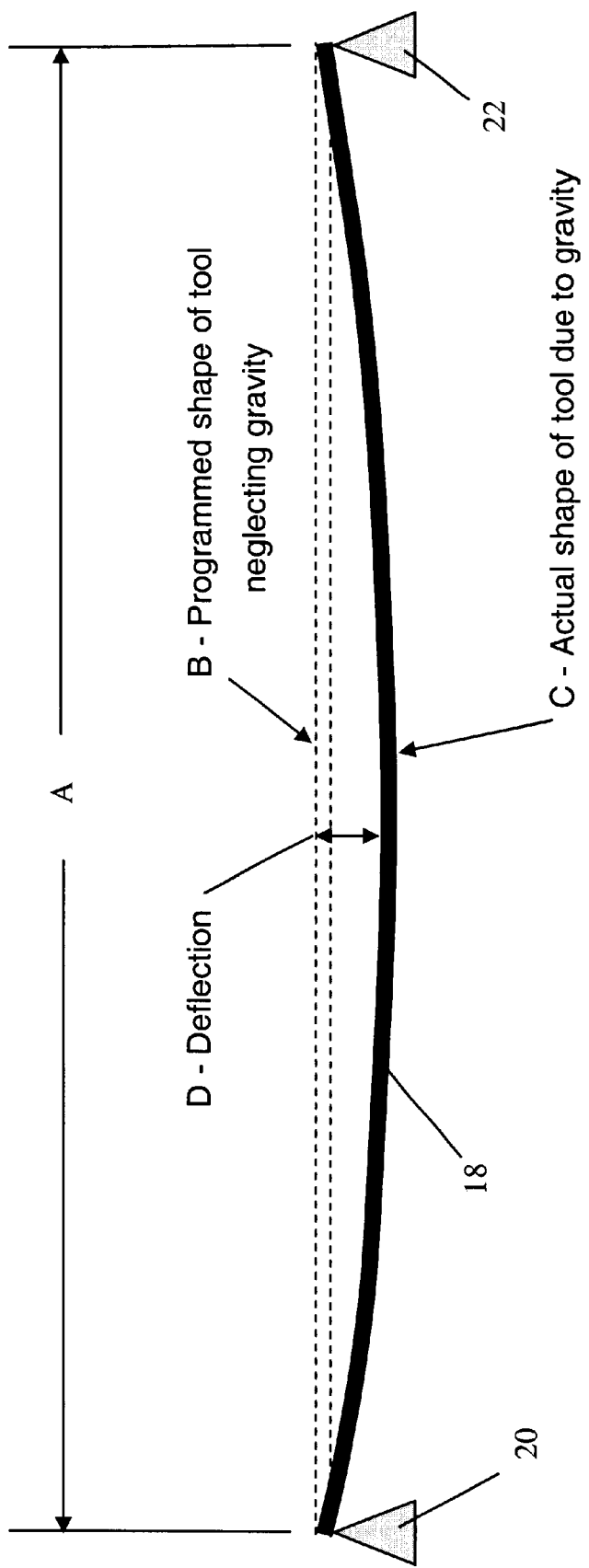
FIG. 2 is an elevational view of a lamination tool used in the present invention showing the difference between the nominal tool and the gravity induced deflection of the tool between support points.

Referring to FIG. 2, an exemplary tool 18 is shown supported by the head stock 20 and the tail stock 22. FIG. 2 shows the programmed shape of the tool neglecting gravity as the programmed tool shape B in phantom. Depending upon both its geometry and the tool length A the tool 18 will deflect by gravity to an exemplary position shown in FIG. 2. An actual tool shape C is represented which includes the gravity induced deflection D. In an exemplary application of the present invention, the tool length A can be about 12.2 meters (40 ft.). The deflection D in a tool 18 having a length of about 12.2 meters can range between about 1.3 cm (0.5 in.) up to about 2.54 cm (1 in.). A deflection D between about 1.3 cm to about 2.54 cm is unacceptable for most laminate applications as the individual fibers are incorrectly spaced by this amount of deflection.

Figure 3A:
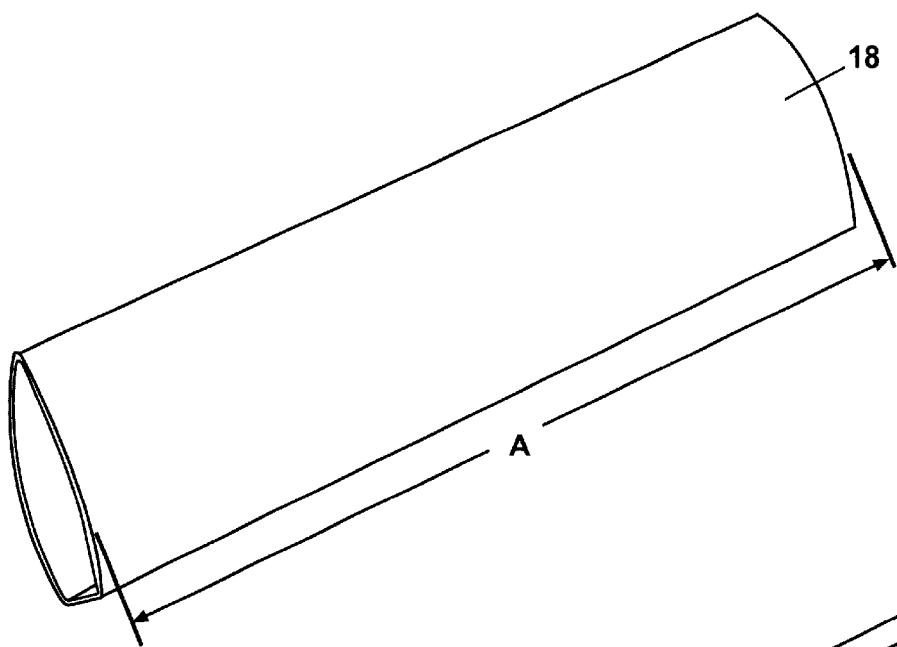
FIG. 3A is a perspective view of a typical tool used for lamination.
Figure 3B:
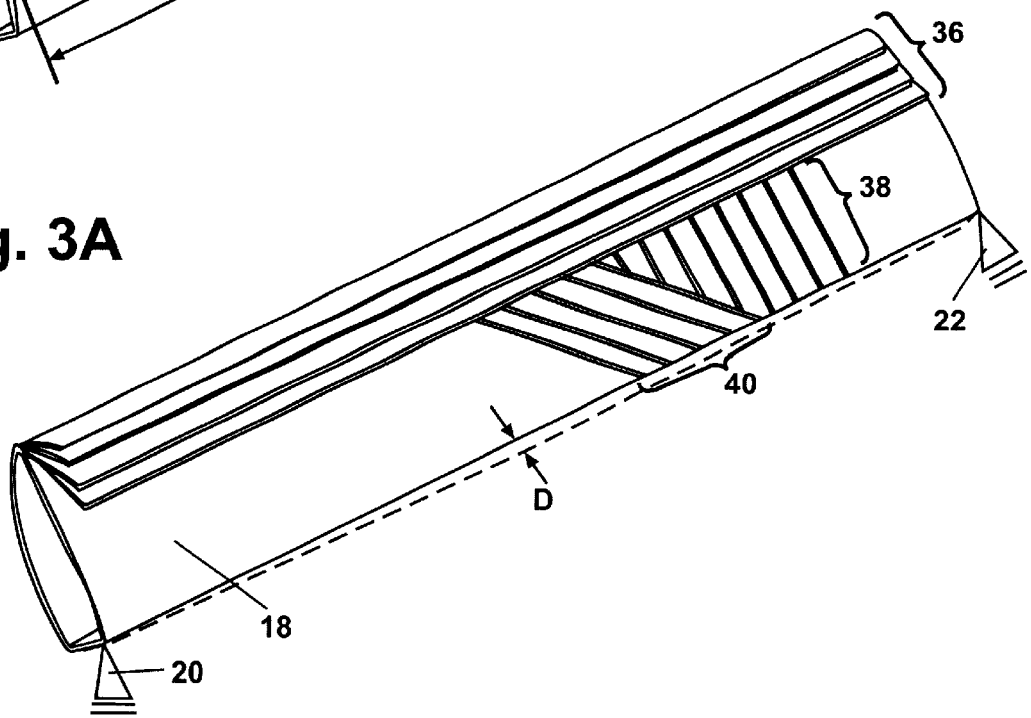
FIG. 3B is a perspective view of the tool of FIG. 3A showing individual layers of lamination applied in a variety of orientations.

Referring now to FIGS. 3A and 3B, another exemplary embodiment of a tool 18 is shown before and during the lamination process. In FIG. 3A, the tool 18 is shown having a tool length A, a tool height E, and a tool width F (as a maximum dimension). The tool 18 therefore defines a curved surface G over which individual laminate layers are placed. Depending on the orientation of the tool 18 as it is supported by the tool support 12 of FIG. 1, the amount of deflection in the tool 18 can vary.

In FIG. 3B, a plurality of layers of laminate are shown (having an exaggerated width) during the installation process. Each layer typically comprises a series of courses, each course applied by a single pass of the application head 26 (shown in FIG. 1). A plurality of horizontal laminate layers 36, a plurality of vertical laminate layers 38, and a plurality of angled laminate layers 40 are shown. The orientation of each of the laminate layers 36, 38 and 40, respectively, are typical of the orientation of individual laminate layers on the tool 18. The horizontal laminate layers 36 are typically applied along a tool longitudinal axis H. The vertical laminate layers 38 are typically applied perpendicular to the plurality of horizontal laminate layers 36. The angled laminate layers 40 are typically applied at about a 45 degree angle to the vertical laminate layers 38 and the horizontal laminate layers 36, respectively. FIG. 3B also shows the head stock 20 support point and the tail stock 22 support point. The amount of deflection D between the head stock 20 and the tail stock 22 for the tool 18 is shown in phantom in FIG. 3B. An even spacing between each course of the laminate layers 36, 38, and 40 is desirable. An even spacing is not achievable if the deflection D is not compensated for during laminate application.

It should also be noted that a cantilevered arrangement (not shown) can be used to support the tool 18. A cantilevered arrangement having a single support such as the head stock 20 can result in deflection of the tool 18 at a distal, unsupported end of the tool 18 which equals or exceeds the deflection if two (or more) support points are used. The principles of the present invention apply to a tool 18 having any number of support points when a deflection due to gravity exists for an unsupported length.

Figure 4:
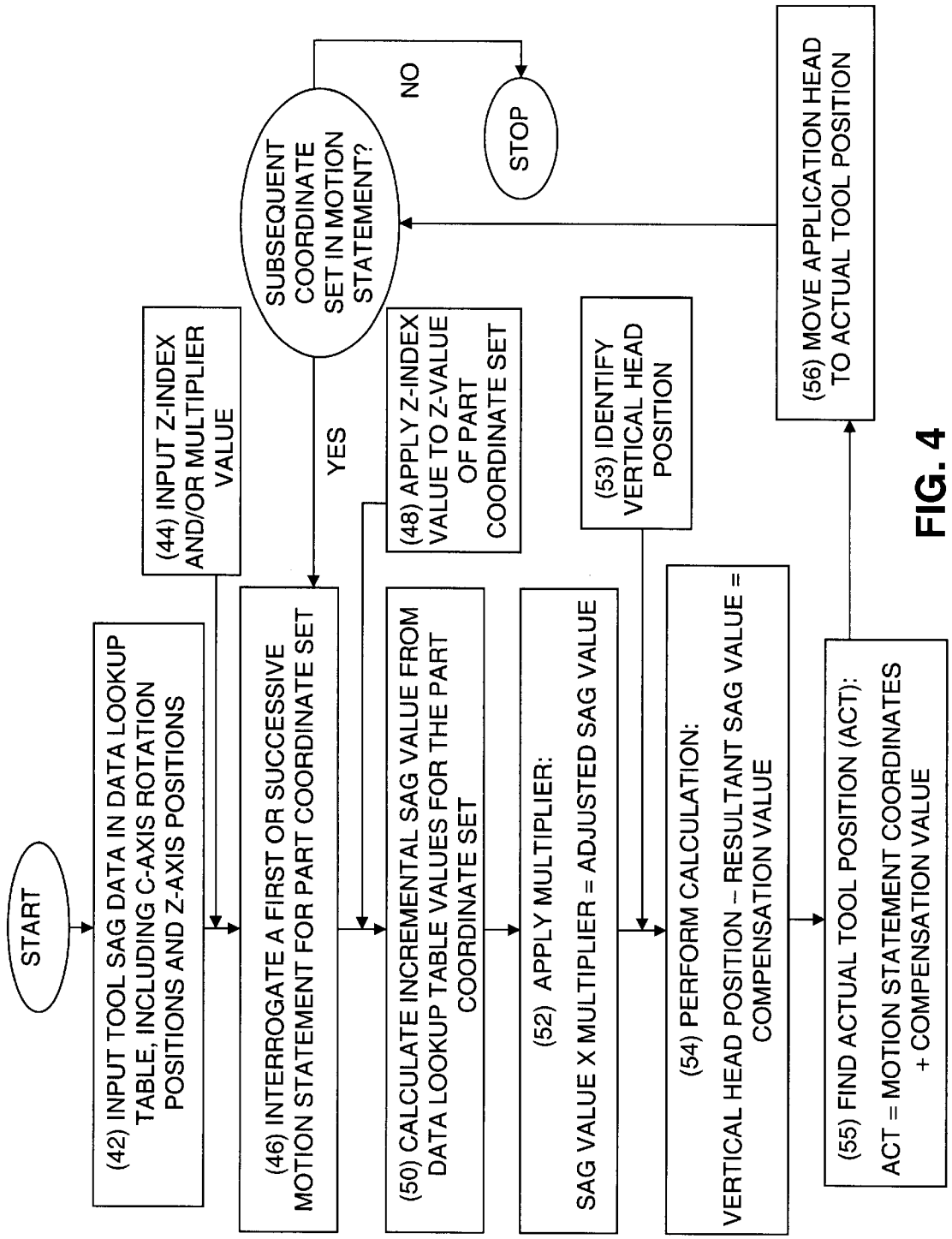
FIG. 4 is a block diagram identifying the successive steps that are used to identify and produce the compensation value using the deflection compensation system of the present invention.

Referring now to FIG. 4, the steps necessary to provide the compensation value used by the application head 26 shown in FIG. 1 are described. In an input step 42 known or calculated sag values for a specific tool 18, including C-axis rotation position and Z-axis position are input in a data lookup table 58 stored in the computer 16. In an input step 44, a Z-Index value and/or a multiplier value are input into the computer 16 database. In an interrogation step 46 a macro interrogates a first or a successive motion statement which describes the motion of the application head 26 along the tool 18 to identify a first or a successive part coordinate set of the tool 18. In an optional addition step 48, the Z-Index value input in step 44 is applied to the Z-value of the part coordinate set to adjust the machine Z-value to the appropriate Z-value on the lookup table. In a calculation step 50, using values in the data lookup table and the coordinate set, a tool incremental sag value is calculated. In a multiplier step 52, the incremental sag value is multiplied by the multiplier input in step 44 to determine an adjusted sag value. In a data determination step 53, a nominal vertical position of the application head 26 is identified from the motion statement. In a compensation value calculation step 54, the resultant sag value is subtracted from the nominal vertical position of the application head 26 to determine a compensation value. In a compensation step 55, an actual tool position for the tool 18 is determined by adding the compensation value to the motion statement coordinate set. In a motion step 56, the application head 26 is directed to the actual tool position. Following the motion step 56, the macro searches for a subsequent motion statement. If a subsequent motion statement is found, the program returns to the interrogation step 44. If a subsequent motion statement is not found, the program stops.

Referring now to FIG. 5, an exemplary lookup table 58 is provided, representing one of a plurality of lookup tables, each used to separately identify a different tool. The lookup table 58 provides a plurality of selected measured or calculated sag values for each tool 18. Each sag value in the lookup table 58 has an associated C-axis rotation position and a Z-axis position along the tool 18. The lookup table is used as follows:

For an exemplary location identified in row C4, the tool 18 is rotated 135 degrees from its zero or home position. For the horizontal axis point Z4 having the C4 rotation of 135 degrees, a distance in inches is given to locate the point Z4 from the home position. In this case, point Z4 is 125 inches (3.1 m) from the home position of the tool 18 at its left end (as viewed in FIG. 1). By finding the intersection between row C4 and column Z4, the lookup table 58 identifies that an incremental sag value of 0.502 in (1.27 cm) applies at a point 125 inches from the home position and at a rotation position of 135 degrees.

To determine a sag value for any position of the tool 18 not provided in the lookup table 58, the computer macro identifies a coordinate set for a nominal location of the applicator head 26 from a motion statement. The macro then enters the lookup table 58 and identifies two values for each of the C-axis rows and the Z-axis columns which bound the coordinate set C-axis value and Z-axis value. A sag value is interpolated between the bounding values using the equation on page 14, and as further defined on page 15. For an exemplary C rotation of 135 degrees and a Z location of 140 in., an interpolated sag value midway between the Z4 and Z5 values applies, or midway between 0.502 in. and 0.323 in. (resultant sag=0.412 in.). If the above example is changed such that a C rotation position of 157.5 degrees is used (midway between the C4 position and the C5 position), an interpolated sag value of 0.389 results. To provide the smoothest transition between data points in the lookup table 58, a curve-fit approximation, as known in the art, can also be applied.

By providing a minimum number of measured or calculated sag values and interpolating between the sag values given in the lookup table 58, the number of points required to create the lookup table 58 is minimized. At the option of the programmer, more points can be added to the lookup table 58 to provide a still finer locating coordinate for the application head 26. It is noted that the Z values given in the lookup table 58 are identified as positive values. This represents one example of a sign convention used when programming the lookup table 58. The Z values can also be identified as negative values.

The motion statement described herein is a computer program known in the art which is used to direct the application head 26 to its pre-programmed location adjacent to the tool 18 when the tool 18 is in its nominal or non-deflected state. For each motion statement, a sag value can be determined from the lookup table 58. Each Z-axis position (indexed to the lookup table), and each C-axis rotation position are used to calculate the sag value from the lookup table 58.

In the input step 48 and the calculation step 50 of FIG. 4, a multiplier value is applied following the initial calculation of the incremental sag value from the lookup table 58. The multiplier value can be one of a plurality of values, unique to each tool 18, which is used to correct the sag values derived from the lookup table. When a global condition such as ambient temperature affects the amount of sag in the tool 18, the multiplier value can optionally be used to adjust for the condition. When used, the multiplier value globally adjusts the sag value.

In a preferred embodiment of the present invention, it is desirable to interface between the executable file (i.e., the computer file containing the motion statement) and the operating system via a computer "window" known in the art. The system executable prompts for the name of the path file containing the motion statement to be processed and the name of the table to use (default to the last file used). In addition to prompting for the table and path file names, the executable queries the user for a multiplier and a Z-Index value. After prompting for these inputs, the executable creates a new path file. The new path file includes the compensated motion statement values to provide a sag compensated position for the application head 26 before the application head 26 moves to its first or subsequent location.

The following information is input to initialize the deflection compensation system of the present invention. (1) X and Y components of the motion statement before sag compensation; (2) the C-axis rotation angle; (3) the Z-axis position. The Z-axis position is indexed to the lookup table, i.e., the part coordinate set Z-axis position plus a Z-index value (defined further below) provides the true Z-axis position relative to the lookup table; (4) a table of calculated sag values at known C and Z-axis positions (the table consists of a simple text file and is built according to a predetermined format); (5) a path file containing individual motion statements from programming software; (6) the multiplier (the default value of the multiplier is 1.00 and in a preferred embodiment a range of 0.01 to 10.00 is used). Any suitable range of values can be used for the multiplier. The multiplier is applied to the sag value before modifying the X and Y components of the motion statement to globally adjust a vertical axis position of the application head 26 relative to the tool 18; and (7) the Z-index. The default value of the Z-Index is 0.000 and in a preferred embodiment a range of −99.000 to +99.000 is used. Any suitable range of values can be used for the Z-Index, and the values can be positive or negative. The Z-Index is applied to the Z-axis value before extracting sag values from the lookup table 58.

The Z-axis position that is extracted from the motion statement of the machine control data (MCD) file represents the actual position of the application head 26 on the Z-axis. When the tool 18 is placed in the tool support 12 (shown in FIG. 1), the tool 18 may require an extension or a spacer to provide clearance to all the machinery parts of the tool support 12. Where an extension or a spacer is provided, the location of the tool 18 on the Z-axis changes from that provided in the motion statement. A variable is therefore used to index the tool 18 to the data lookup table to correct for the actual location of the tool 18 on the tool support 12. This variable is the Z-Index value. The Z-Index value(s) are applied prior to extracting data from the lookup table 58.

The C-axis position is calculated using the surface normal vector information in the motion statement. C is calculated using the following steps: first, to determine the quadrant of the C-axis rotation, a quadrant based on the X and Y values of each motion statement is selected from the following 4 equations, a) +X, +Y=Quadrant 1; b) −X, +Y=Quadrant 2; c) −X, −Y=Quadrant 3; and d) +X, −Y=Quadrant 4. Second, the Offset within the quadrant is calculated using the following formula: Offset=arctan $\{|Y|/|X|\}$. Third, the C-axis rotation is found based on the appropriate quadrant and the following index formulas: for Quadrant 1: C=Offset; for Quadrant 2: C=180−Offset; for Quadrant 3: C=180+Offset; and for Quadrant 4: C=360−Offset.

To calculate a sag value from the lookup table 58, the following exemplary formula is used:

Equation #1:

$$Sag = M\left\{S_i + \left(\frac{Z - L\min}{L\max - L\min}\right)\left(\frac{(S_2 - S_1) + (S_4 - S_3)}{2}\right) + \left(\frac{C - R\min}{R\max - R\min}\right)\left(\frac{(S_3 - S_1) + (S_4 - S_2)}{2}\right)\right\}$$

Where: $S_1$, $S_2$, $S_3$ and $S_4$ are adjacent sag values. For example, in the exemplary lookup table 58 shown in FIG. 5, for a desired rotation position (C value) between 135 and 180 degrees, and horizontal position (Z value) between 125 and 155 in., $S_1$=0.502, $S_2$=0.323, $S_3$=0.439, and $S_4$=0.292.

Rmin is the lowest adjacent C rotation value (in the exemplary case location C4 in FIG. 5);

Rmax is the highest adjacent C rotation value (in the exemplary case location C5 in FIG. 5);

Lmin is the lowest adjacent Z-axis value (in the exemplary case location Z4 in FIG. 5);

Lmax is the highest adjacent Z-axis value (in the exemplary case location Z5 in FIG. 5);

Z is the resultant Z table position following Z-index value application; and

M is the multiplier value selected.

The calculated sag value is then applied to the X and Y values of the selected motion statement by the following:

$\Delta X = \text{SIN}(C)(\text{Sag})$ $\Delta Y = -1(\text{COS}(C)(\text{Sag}))$ and $X\text{new} = X(\text{uncomp}) + \Delta X$ $Y\text{new} = Y(\text{uncomp}) + \Delta Y$ Using the above formulas and the lookup table values, sag is calculated for each motion statement and added to the respective X(uncompensated) and Y(uncompensated) values to develop values for Xnew and Ynew for each motion statement. This process is repeated for every motion statement in the MCD.

The systems and methods of the present invention can also be used in a variety of NC operations, including but not limited to: machining operations, forming operations, welding operations, peening operations, painting operations, inspection operations and measurement operations.

It will be obvious to one skilled in the art that many variations of the equations identified herein can be used to calculate a sag value. The equations given herein are exemplary of one embodiment of the present invention, and variations of these equations are within the spirit and scope of the present invention.

The deflection compensation system of the present invention provides several advantages. By compensating for the gravity induced sag of a large or long part or tool used for laminate part construction, a higher quality product is produced. By providing a curve fit calculation to identify the amount of sag at each point in the tool used in a laminate part construction on an NC machine, a more accurate means of laying the individual laminate layers is provided. The system of the present invention also offers the advantage that the individual tool or tools used for a laminated part can have their sag values pre-calculated such that each time the tool is used, the sag amount is known and can be repetitively applied to the laminated part construction. By applying an index table or a lookup table of data for each individual tool, the tool bending stiffness is incorporated in the calculations of the sag values. As the tool bending moment changes as the tool rotates, the changing tool deflection is included in the sag compensation value.

The description of the invention is merely exemplary in nature and, thus, variations that do not depart from the gist of the invention are intended to be within the scope of the invention. Such variations are not to be regarded as a departure from the spirit and scope of the invention. Therefore, while this invention has been described in connection with particular examples thereof, the true scope of the invention should not be so limited since other variations will become apparent to the skilled practitioner upon a study of the drawings, specification and the following claims.

What is claimed is:

1. A method to compensate for vertical sag of at least partially unsupported item lengths during manufacture, said method comprising the steps of:

specifying a nominal configuration for an item of manufacture;

at least partially supporting said item of manufacture from a machine to perform an operation on said item of manufacture;

determining a vertical sag value for each of a predetermined plurality of Z-axis positions along an unsupported length of said item of manufacture;

calculating a vertical dimensional difference between each said vertical sag value and its corresponding Z-axis position;

finding an interpolated vertical dimensional difference between adjacent Z-axis positions; and compensating said operation with one of each said dimensional difference and said interpolated vertical dimensional difference to ensure an actual configuration of said item of manufacture matches said nominal configuration.

2. The method of claim 1, further comprising the step of assigning each Z-axis position one each of a longitudinal coordinate and a rotational coordinate.

3. The method of claim 2, further comprising the steps of:
selecting a partial set of Z-axis positions from said plurality of Z-axis positions; and
inputting said partial set of Z-axis positions in a data table.

4. The method of claim 3, further comprising the steps of:
inputting said data table in a computer;
loading select ones of said plurality of vertical sag values each corresponding to one of said partial set of Z-axis positions in said data table; and
interpolating between said select ones of said plurality of vertical sag values to identify one of a plurality of new sag values.

5. The method of claim 4, further comprising the steps of:
identifying at least one machine support point coordinate;
measuring each said Z-axis position of said item of manufacture from said support point coordinate; and
varying at least one of said longitudinal coordinate and said rotational coordinate.

6. The method of claim 5, further comprising the step of identifying said item of manufacture as a numerical manufacturing model in a database of said computer.

7. The method of claim 6, further comprising the step of programming said numerical manufacturing model as a plurality of motion statements, each motion statement corresponding to one of said Z-axis positions.

8. The method of claim 7, further comprising the step of inputting a plurality of equations into said computer database to calculate each of said plurality of new sag values.

9. The method of claim 4, further comprising the step of controlling said machine as a numerically controlled (NC) machine with said computer to perform said operation on said item of manufacture.

10. The method of claim 9, further comprising the step of adapting said numerically controlled machine to perform one of a laminating operation, a machining operation, a forming operation, a welding operation, a peening operation, a painting operation, an inspection operation, and a measurement operation.

11. A method to compensate for vertical deflection of parts manufactured by a numerically controlled (NC) machine, said method comprising the steps of:
mounting a workpiece on an NC machine for receiving a material from a material application head of said NC machine, said workpiece having a set of actual workpiece coordinates including a plurality of actual horizontal components, a plurality of actual rotational components for each actual horizontal component, and a vertical sag component for each actual horizontal component;
locating the material application head in one of a plurality of application head positions using a set of nominal coordinates, each of said nominal coordinates including at least a nominal horizontal component, a nominal rotational component, and a nominal vertical component;
calculating a difference between the workpiece vertical sag component and the application head nominal vertical component;
multiplying the difference by a multiplier value to provide an adjusted sag value; and
subtracting the adjusted sag value from the nominal vertical component of the vertical head position to provide an application head compensation value.

12. The method of claim 11, comprising the step of repeating said calculating, multiplying and subtracting steps for each of said plurality of application head positions to provide each of a plurality of successive application head compensation values.

13. The method of claim 12, further comprising the step of connecting said NC machine to a computer database having at least one data entry table.

14. The method of claim 13, further comprising the step of loading selected ones of said set of actual workpiece coordinates, including each actual horizontal component, each actual rotational component and each vertical sag component in one of said at least one data entry table.

15. The method of claim 14, further comprising the step of calculating said plurality of successive application head compensation values from said data entry table using said computer database.

16. The method of claim 15, further comprising the step of interrogating each of said at least one data entry tables for one of an initial workpiece axis position and one of a plurality of successive workpiece axis positions.

17. The method of claim 16, further comprising the step of loading a workpiece coordinate position into said one of said data entry tables.

18. The method of claim 17, further comprising the step of adjusting said workpiece coordinate position at said initial workpiece axis position using said application head compensation value and at each of said plurality of successive workpiece axis positions using one of said successive application head compensation values.

19. The method of claim 18, further comprising the step of adjusting said workpiece coordinate position in one of an X-axis position, a Y-axis position, and a Z-axis position.

20. The method of claim 18, further comprising the step of adjusting said workpiece coordinate position in each of an X-axis position, a Y-axis position, and a Z-axis position.

21. A method to laminate a fiber laminated component, said method comprising the steps of:
developing a numerical manufacturing model for a fiber laminated component;
programming a numerical manufacturing machine to laminate said component;
positioning a mold of said fiber laminated component on said numerical manufacturing machine;
interpolating to determine a vertical deflection between any two adjacent points of a plurality of unsupported points for said mold;
calculating a difference between said vertical deflection for each of said plurality of unsupported points and said numerical manufacturing model; and
compensating said numerical manufacturing machine for each said difference.

22. The method of claim 21, further comprising the step of laminating a plurality of layers of said fiber laminated component.

23. The method of claim 22, further comprising the step of adjusting a laminating head of said numerical manufacturing machine for each said vertical deflection.

24. The method of claim 23, further comprising the step of following a contour of said fiber laminated component with said laminating head.

25. The method of claim 24, further comprising the step of calculating said contour for each of an X-axis position, a mold perimeter C-axis rotated position, and a Z-axis position.

26. A system to compensate for vertical deflection of an end-supported laminated part during manufacture, said system comprising:

a numerically controlled (NC) machine having at least one support end, a laminate application head, and a computer for controlling said laminate application head;

said at least one support end supports each of a plurality of laminate fabrication tools;

said laminate application head having a plurality of location coordinate points each having a nominal value; and said computer having a program to one of calculate a compensation value for each of said location coordinate points and interpolate the compensation value between adjacent location coordinate points;

wherein for each location coordinate point of said application head, a gravity induced vertical deflection of a select one of said laminate fabrication tools supported by said at least one support end is calculated by said computer, said vertical deflection is convertible to said compensation value, and said compensation value is subtracted from said nominal value to provide a new coordinate value usable by said NC machine to position said laminate application head to follow said gravity induced vertical deflection of said tool.

27. The system of claim 26, wherein each of said plurality of laminate fabrication tools has a plurality of laminate application surfaces.

28. The system of claim 27, wherein said computer further comprises a database having at least one data table.

29. The system of claim 28, wherein said at least one data table includes at least a C-axis rotation data set and a Z-position data set.

30. The system of claim 26, wherein said program further comprises a multiplier value to globally adjust said gravity induced vertical deflection of said tool.

31. The system of claim 28, wherein said at least one data table further comprises a nominal coordinate set of said select one of said laminate fabrication tools.

32. A method to compensate for vertical deflection of parts manufactured by a numerically controlled machine, the numerically controlled machine having a material application head, said method comprising the steps of:

mounting a temporary tool on the numerically controlled machine operable to receive a material from the material application head, the temporary tool having a set of actual tool coordinates including a vertical sag component;

locating the material application head at a nominal vertical coordinate;

calculating a difference between the vertical sag component and the nominal vertical coordinate;

multiplying the difference by a multiplier value to provide an adjusted sag value;

subtracting the adjusted sag value from the nominal vertical coordinate to provide an application head compensation value; and moving the application head to perform a material deposition operation on the temporary tool using the application head compensation value.

33. The method of claim 32, comprising:

curing the at least one layer of material; and removing the at least one layer of material from the temporary tool.

34. The method of claim 32, comprising locating the material application head in one of a plurality of application head positions using a set of nominal coordinates, each of the nominal coordinates including at least a nominal horizontal component, a nominal rotational component, and the nominal vertical component.

35. The method of claim 32, comprising mounting the temporary tool using a plurality of actual horizontal components and a plurality of actual rotational components for each actual horizontal component.

36. The method of claim 11, comprising forming the workpiece as a mold operably adaptable to receive the material.

* * * * *